Figure 1:
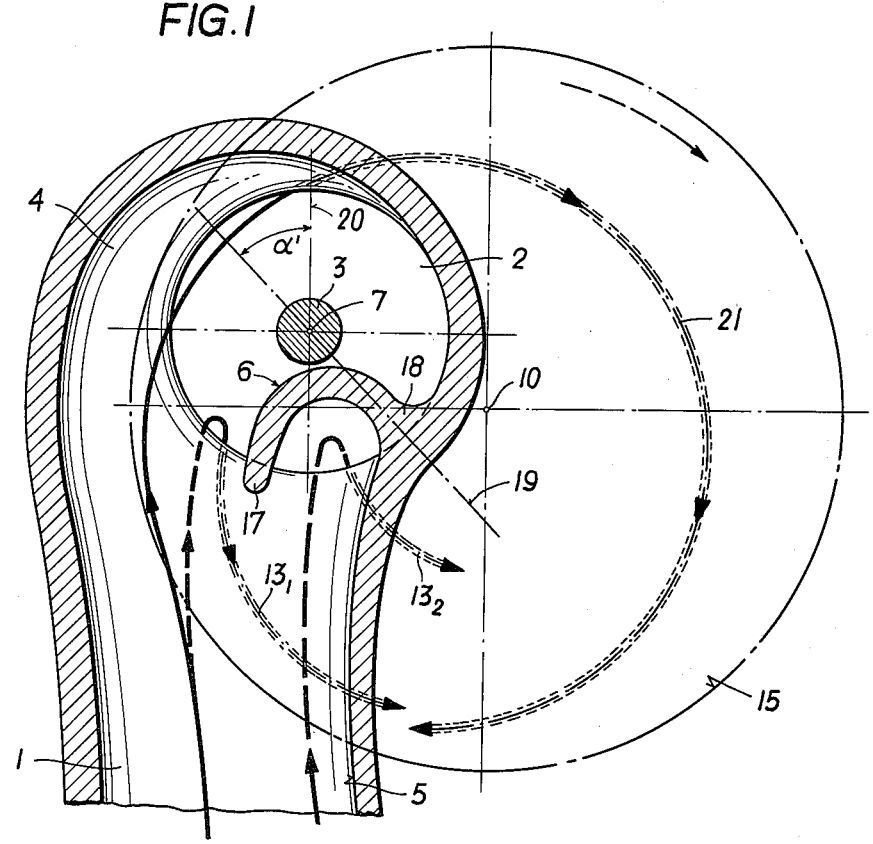

United States Patent

List et al.

[11] 3,884,209
[45] May 20, 1975

[54] INLET PORT FOR INTERNAL COMBUSTION ENGINES

[75] Inventors: Hans List; Josef Affenzeller; Karl Kirchweger, all of Graz, Austria

[73] Assignee: Hans List, Graz, Austria

[22] Filed: July 18, 1973

[21] Appl. No.: 380,240

Related U.S. Application Data

[62] Division of Ser. No. 271,234, July 13, 1972, abandoned.

[30] Foreign Application Priority Data

May 30, 1972 Austria .............................. 2827/72

[52] U.S. Cl. ..................... 123/188 M; 123/188 VA
[51] Int. Cl. ............................................... F02f 1/42
[58] Field of Search.. 123/188 M, 188 VA, 188 GC, 123/30 C, 30 D

[56] References Cited
UNITED STATES PATENTS 2,054,621   9/1936   Frelin ........................... 123/188 VA

FOREIGN PATENTS OR APPLICATIONS 310,679   8/1933   Italy ............................. 123/188 VA
539,948   2/1956   Italy ................................. 123/30.2
888,036   7/1953   Germany ...................... 123/188 M
1,032,972   6/1958   Germany ........................... 123/30.2
1,044,513   11/1958   Germany...................... 123/188 VA
1,048,438   1/1959   Germany...................... 123/188 VA Primary Examiner—Charles J. Myhre
Assistant Examiner—W. Rutledge, Jr.
Attorney, Agent, or Firm—Watson, Cole, Grindle & Watson

[57] ABSTRACT

A cylinder head structure for internal combustion engines, comprising at least one inlet valve having a valve stem, a valve seat for the valve, an inlet duct having an elongated feed portion extending from an inlet opening of the cylinder head to a chamber formed in the inlet duct above and in proximity to the inlet valve and surrounding the valve stem, a rib protruding into the chamber, the rib extending from the wall of the chamber in the direction of the valve stem and being bent into an end portion thereof which protrudes into the feed portion of the inlet duct, the end portion dividing the cross-section of the inlet duct into two parts.

6 Claims, 4 Drawing Figures

INLET PORT FOR INTERNAL COMBUSTION ENGINES

This application is a divisional of application Ser. No. 271,234 filed July 13, 1972 and now abandoned.

The invention relates to a cylinder head structure for internal combustion engines, especially diesel engines, comprising at least one inlet valve having a valve stem, a valve seat for said inlet valve, and an inlet duct having an elongated feed portion extending from an inlet opening of the cylinder head to a chamber formed in said inlet duct above and in proximity of the inlet valve and surrounding said valve stem.

In the cylinders of internal combustion engines of the direct-injection type, the fuel-and-air mixture is produced by the injection of fuel combined with the movement of the air for combustion. This current of air for combustion is mainly a function of the intake process, that is, of the flow conditions prevailing in the area of the intake valve and only to a minor extent of the air flow caused by jets of fuel injected. Accordingly, the intake process provides a means for influencing the flow condition of the air in the cylinder and consequently, the mixture of air and fuel and the course of combustion.

The production of an air flow in the cylinder rotating about the cylinder axis was formerly considered to be one of the most efficient methods of improving the formation of the fuel-and-air mixture and assuring a convenient course of combustion. For the purpose of producing this air vortex different intake port systems have already been devised which are essentially divided into two groups with regard to the manner in which the rotational flow is produced. One of these groups comprises the so-called helical ducts wherein the inlet port changes in the vicinity of the valve into a duct section wound spiral-shape around the valve axis, wherein the air for combustion is imparted a rotation corresponding to the sense of the spiral winding. The second group of twist-producing inlet ports comprises the so-called inclined ducts extending in an approximately tangential relation to the inner wall of the cylinder at least in the proximity of the valves. These inclined ducts are generally forming a relatively acute angle with the bottom of the cylinder head and occasionally, a sharp edge is provided at the point of transition to the valve bore. With inclined ducts the rotational flow is produced in the cylinder mainly by the exhaust pulse due to the air for combustion entering through the intake valve.

It has been found that not only the production of a rotational current in the cylinder of an internal combustion engine is a determinative factor for the production of a certain fuel-and-air mixture in the cylinder, but the presence of a certain amount of turbulence also plays a decisive part. A high degree of turbulence in the air mixing with the fuel is responsible for a speedy and uniform mixture and consequently, for improved combustion, while major discrepancies of the air-and-fuel ratio within the combustion chamber are thus avoided.

It is the object of the present invention to provide a cylinder head structure for internal combustion engines of the direct-injection type, assuring the production of a rotating and highly turbulent flow of the cylinder charge and capable of superseding the conventional spiral or inclined duct, depending on given constructional requirements for the installation of an inlet port system.

The basic problem is solved in a surprisingly simple manner by means of a rib protruding into said chamber formed in the inlet duct above the inlet valve and surrounding the valve stem, said rib extending from the wall of said chamber in the direction of the valve stem and changing with a bend into an end portion protruding into the feed portion of the inlet duct, said end portion dividing the cross-section of the inlet duct into two parts. By means of the free end portion of this bent rib the air for combustion entering through the inlet port is subdivided essentially into a main air current entering the cylinder through the valve clearance in the direction of the intended air rotation, and into two side currents flowing on both sides of the free extremity of the rib directly to the valve and entering the cylinder in a direction opposed to the main air current. By the collision between these part currents the kinetic energy of the weaker currents is annihilated in such a manner as to produce vehement turbulence, while the weaker current is dragged along by the main air current rotating in the intended sense of rotation. The high degree of turbulence of the resulting rotational flow assures speedy and uniform combustion of the injected fuel.

Moreover, experience goes to show that as a result of the above measures, the proportion of harmful components in the waste gases of the internal combustion engine can be reduced. This fact is of increasing importance in view of world-wide efforts to combat air-pollution.

The degree of turbulence produced and the resulting rotational current in the cylinder can be varied as required by appropriately shaping and dimensioning the rib.

In many cases it will be desirable to alter the intensity of the rotational current and the degree of turbulence produced in the cylinder charge, and consequently, to adapt the flow conditions prevailing in the cylinder so as to suit given requirements, without, however, any alteration of the inlet port.

This problem is solved according to the invention by providing a rib comprising two sections, one of which is stationary and adjoins the wall of the inlet duct, whereas the other section is rotatable about the axis of the intake valve and adjustable in any desired rotational position. This provides an opportunity for splitting the air for combustion flowing towards the chamber of the inlet duct into two part currents if and as required, thereby influencing the rotational and turbulence behavior of the cylinder charge as desired. This is particularly important for the development of novel engine types, since it is thus possible to empirically determine the behavior of the engine, above all with regard to the course of combustion and the composition of waste gases at different positions of the adjustable rib section, and consequently, the most convenient adjustment.

With multi-cylinder internal combustion engines it is furthermore, possible to obtain identical flow conditions in all cylinders by appropriately adjusting the rotatable rib sections in the inlet ports. This is important, particularly since even minor discrepancies in the position and shape of the ports as may be due to core displacements during the casting operation, for example, are liable to lead to considerably diverging flow conditions in the various cylinders.

According to a preferred embodiment of the invention a valve guide bearing is provided in the chamber of the inlet duct, a sleeve is rotatably supported by the valve guide bearing and secured against axial displacement, the sleeve carrying the rotatable section of the rib and being preferably cast integral with the rotatable rib section. This design distinguishes itself by its structural simplicity and comparatively low finishing requirements. At the same time, it is possible to have the cylindrical bearing surface of the valve guide bearing for the rib-supporting sleeve advantageously machined in the same setting adopted also for the machining of the valve seats and/or of the bearing surfaces for the valve seat rings.

According to the last-mentioned embodiment of the invention, an annular groove is provided on the periphery of the valve guide bearing with a radial bore in the sleeve, a bolt being inserted in the radial bore and engaging the annular groove of the valve guide bearing. Preferably the radial bore is designed as a taphole and the bolt screwed into the taphole is provided with a thread for the attachment of the sleeve to the valve guide bearing. Where the bolt serves simultaneously as a setscrew for the sleeve, it should be located at a point on the periphery of the sleeve facing the suction end of the cylinder head within the associated field of traverse of the sleeve, so as to make it possible for the bolt to be conveniently slackened in one place and retightened in another by means of a tool, such as a screwdriver for example, introduced in the inlet port.

According to a further embodiment of the invention, the sleeve is designed as a collet, a radial slot being provided on one side of the collet and a clamping screw being arranged in transverse relation to the slot of the collet.

In order to facilitate the adjustment of the rotatable rib section and to perform adjusting operations even with the engine running, if necessary, according to yet another embodiment of the invention a control mechanism is provided emerging from the cylinder-head and drivingly connected with the rotatable rib section. This embodiment of the invention is particularly useful for research workers as they are thus enabled to study the operational behavior of the engine as altered under the influence of ribadjusting operations. With large-size engines it is also possible, if necessary, to automatically control the control mechanism as a function of any operating data undergoing a change as flow conditions in the cylinder vary.

According to another embodiment of the invention the control mechanism is designed as a shaft rotatably supported by the cylinder head, one extremity of the shaft protruding in the annular chamber of the inlet duct, a follower arranged at the extremity of the shaft, a groove provided on the periphery of the sleeve, said follower engaging the groove of the sleeve. Preferably the follower is designed as a cam. A control mechanism of this type, which can be readily accomodated in the cylinder-head area even when only scant space is available, ensures a range of adjustment for the rotatable rib section which should be fully adequate in most cases.

Figure 2:
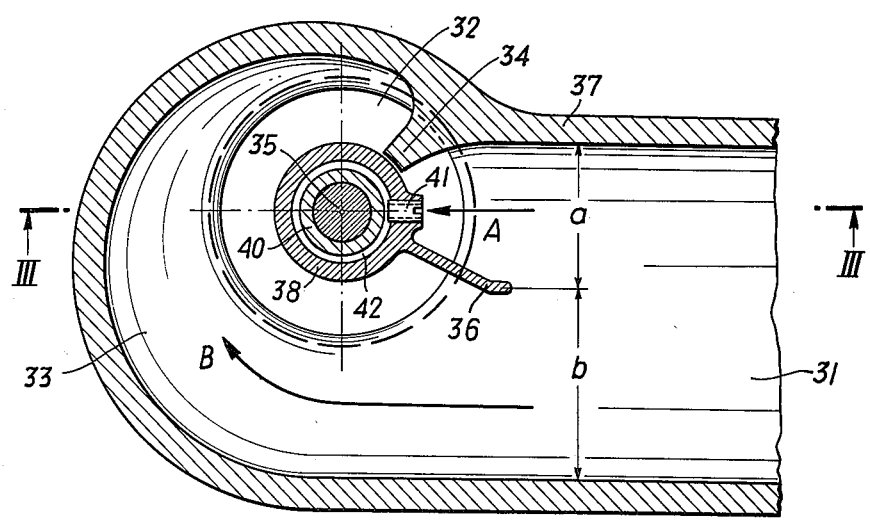
Figure 3:
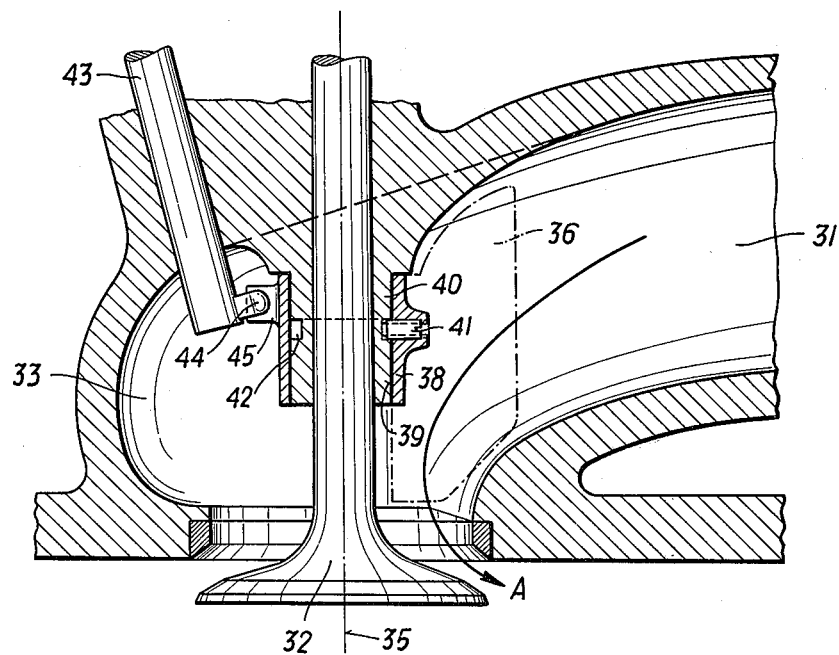
Figure 4:
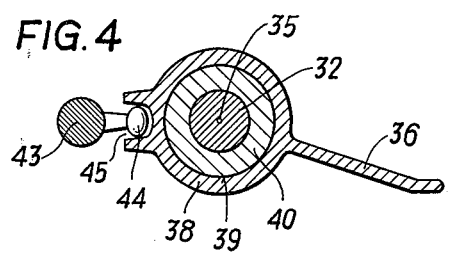

Further details of the invention will become apparent from the following description of several embodiments of the invention with reference to the accompanying drawings in which FIG. 1 is a partially horizontal cross-sectional view of an inlet port according to the invention, FIG. 2 a horizontal cross-sectional view of another variety of the inlet port according to the invention, FIG. 3 a cross-sectional view of the inlet port on line III—III of FIG. 2, and FIG. 4 a partially horizontal cross-sectional view of another embodiment of the invention.

In the embodiment of the cylinder head shown in FIG. 1 the inlet duct 1 is in principle, similar to a spiral duct of conventional design. In the area above the intake valve 2, the inlet duct 1 changes into a helical annular chamber 4 arranged around the valve stem 3. As different from spiral ducts of conventional design, this annular chamber 4 is subdivided by means of a rib 6 protruding into the annular chamber 4. In the embodiment shown, the rib is an extension of the partition 5 of the inlet duct 1. The rib 6 has a bend in opposition to the main direction of the intended rotational flow in the cylinder. The free extremity 17 of the rib points approximately in the direction of the axis of the inlet port 1. At its base 18, the rib 6 takes a direction as indicated by the dot-and-dash line 19, forming an angle $\alpha$ of about 90° with the direction 20 of the main current in the inlet port 1, also indicated by a dash-and-dot line. Reference numerals 7 and 10 designate the axes of the intake valve 2 and the cylinder 15 of the combustion engine.

The free extremity 17 of the rib 6 splits the air for combustion entering via the inlet port 1 up into a main current 21 and two side currents $13_1$ and $13_2$. As in the embodiments of the invention hereabove described, the main current 21 enters the cylinder via the valve clearance in the sense of the desired air rotation. The two side currents which are allowed to develop without interference from the main current on both sides of the free extremity 17 of the rib, pass into the cylinder in spaced relation to each other in the area of the valve clearance opposite the exit of the main current 21 in a radial direction in relation to the valve axis 7 and are imparted a direction of flow in opposition to the main current 21. The collision between the opposed air currents produces a high degree of turbulence in the cylinder.

In the embodiment of the invention illustrated in FIG. 2, the inlet port 31 changes in the area above the intake valve 32 into a helical annular chamber 33 which is subdivided by means of a two-piece rib composed of a stationary rib section 34 and a second rib section 36 rotatable about the valve axis 35. The stationary rib section 34 directly adjoins the inner partition 37 of the inlet port 31 and extends in an approximately radial direction in relation to the valve axis 35.

The rotatable rib section 36 is located on a tubular sleeve 38 rotatably supported by a cylindrical bearing surface 39 of the valve guide bearing 40 which is concentrical in relation to the valve axis 35. The sleeve 38 with the rib section 36 is secured against axial displacement by means of a bolt with thread 41 screwed into a radial taphole of the sleeve 38 and engaging an annular groove 42 of the valve guide bearing 40. By tightening the bolt 41 against the base of the annular groove 42 the sleeve 38 with the rib section 36 can be fixed in any desired rotational position.

By means of the rib section 36 the cross-section of the inlet port is subdivided into two part cross-sections $a$ and $b$. The air for combustion entering through the inlet port 31 is split up in accordance with these part cross-sections $a$ and $b$ into part currents A and B respectively. The part current A flows between the two rib sections 4 and 6 directly to the valve clearance and enters the cylinder in a direction which is opposed to the desired sense of rotation of the air current in the cylinder.

The part current B enters the annular chamber 33 and initially follows the pattern of the wall of the annular chamber. The part current B tends to flow around the valve axis 35 clockwise as in a conventional spiral ducts. However, it is prevented from so flowing by the stationary rib portion 34 which exerts a damming action upon the part current B, as a result of which it is made to pass through the valve gap in the direction of the intended rotational flow in the cylinder. The two part currents A and B which thus flow in the cylinder in opposite senses of rotation in a manner not shown in the drawings, collide with each other inside the cylinder so that the kinetic energy of the weaker part current is annihilated whereby vehement turbulence is produced, the weaker part current being entrained by the stronger part current in the latter's sense of rotation. As a result, a turbulent rotational flow is produced in the cylinder and leads to an intensive mixture between the air for combustion and the fuel injected in the cylinder. The degree of air rotation and the extent of turbulence in the cylinder charge are determined by the position occupied by the rotatable rib section 36. The smaller the cross-section $a$ of the inlet port 31 available for the part current A, the lower the kinetic energy of the part current A, so that during its collision with the far stronger part current B only comparatively minor turbulence is produced. As a result, rotation of the air for combustion caused by the part current B inside the cylinder diminishes to a minor extent only.

As the cross-section $a$ increases, however, turbulence in the cylinder increases while the rotational flow of the cylinder charge diminishes.

Accordingly, by appropriately adjusting the rotatable rib section 39 it is possible to alter the flow conditions prevailing in the cylinder within wide limits and to adapt it so as to suit any given requirements. In order to simplify the adjustment of the rotatable rib section 36 and if necessary, to perform the adjustment also while the internal combustion machine is in operation, a control mechanism as shown in FIG. 3 is provided, consisting of a shaft 43 rotatably supported in the cylinder head and carrying a follower 44 at its annular chamber end, said follower engaging a groove 45 provided on the periphery of the sleeve 38.

The same control mechanism is also provided in the embodiment of the invention shown in FIG. 4. It differs, however, from the one illustrated in FIGS. 2 and 3 insofar as the bolt with thread 41 formerly provided for securing the sleeve 38 against rotation, has here been omitted.

The scope of the invention is not restricted to the embodiments of the invention as hereabove described and as illustrated in and by the accompanying drawings. In particular, variations are possible with regard to the arrangement and design of the bent rib which subdivides the annular chamber.

It is furthermore possible to apply the principle underlying the present invention to existing spiral ducts by subsequently incorporating a rib. Within the scope of the present invention it is also possible to attach the rotatable rib section to a collet having a slot on one side and clamped to the valve guide bearing by means of a clamping screw extending in transverse relation to the slot.

We claim:

1. A cylinder head structure for internal combustion engines, especially diesel engines, comprising at least one inlet valve having a valve stem, a valve seat for said inlet valve, an inlet duct having an elongated feed portion extending from an inlet aperture of the cylinder head to a chamber formed by said inlet duct above and in proximity to said inlet valve, said chamber forming a spiral-shaped inlet duct portion wound around said valve stem and extending downward to said valve seat, a valve guide bearing extending into the chamber and encompassing said valve stem, a rib located in said spiral-shaped duct portion and comprising a stationary and a rotatable portion, the stationary portion of said rib extending from a point of the wall of said spiral-shaped duct portion located close to the axis of the associated cylinder as far as said valve stem and said valve guide bearing in a plane including the valve stem axis, a sleeve rotatably arranged on said valve guide bearing and secured against axial displacement, said sleeve carrying the rotatable portion of the rib, protruding into the feed portion of the inlet duct in a plane including the valve stem axis and dividing the cross-section of the inlet duct in two.

2. A cylinder head structure according to claim 1, further comprising a control mechanism drivingly connected with the rotatable rib section and comprising a shaft rotatably supported by the cylinder head and extending through the same, one extremity of said shaft protruding into said spiral-shaped duct portion, a follower arranged at said one extremity of said shaft, a groove provided on the periphery of said sleeve, and said follower engaging the groove of said sleeve.

3. A cylinder head structure according to claim 2, wherein the follower is designed as a cam.

4. A cylinder head structure according to claim 1, wherein the rotatable rib portion is cast integral with the sleeve.

5. A cylinder head structure according to claim 1, wherein an annular groove is provided on the periphery of the valve guide bearing with a radial bore in the sleeve, a bolt being inserted in the radial bore and engaging the annular groove of the valve guide bearing.

6. A cylinder head structure according to claim 5, wherein the radial bore of the sleeve is designed as a taphole and the bolt screwed into the taphole is provided with a thread for the attachment of the sleeve to the valve guide bearing.

* * * * *